US012519890B2

(12) United States Patent
Bailey et al.

(10) Patent No.: US 12,519,890 B2
(45) Date of Patent: Jan. 6, 2026

(54) VOICE OVER WI-FI AVOIDANCE ON GATEWAY DEVICES

(71) Applicant: T-Mobile Innovations LLC, Overland Park, KS (US)

(72) Inventors: Christopher Bailey, Overland Park, KS (US); Ryan Dreiling, Shawnee, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 300 days.

(21) Appl. No.: 18/187,213

(22) Filed: Mar. 21, 2023

(65) Prior Publication Data

US 2024/0323282 A1    Sep. 26, 2024

(51) Int. Cl.
*H04M 3/00* (2024.01)
*H04L 12/66* (2006.01)
*H04L 65/102* (2022.01)
*H04L 65/1069* (2022.01)
*H04M 5/00* (2006.01)
*H04M 7/00* (2006.01)

(52) U.S. Cl.
CPC ...... *H04M 7/0075* (2013.01); *H04L 65/1069* (2013.01); *H04M 7/0066* (2013.01); *H04L 65/102* (2013.01)

(58) Field of Classification Search
CPC .............. H04L 67/141; H04L 63/0876; H04L 12/2803; H04L 41/0806; H04L 2012/2841; H04L 67/303; H04L 67/12; H04L 43/0876; H04L 43/08; H04L 12/1831; H04L 43/065; H04L 2209/80; H04L 63/18; H04W 84/12; H04W 76/11; H04W 8/005; H04W 48/18; H04W 48/20; H04W 88/16; H04W 76/10; H04W 60/00; H04W 24/02; H04M 7/0069; H04M 2207/185

See application file for complete search history.

(56) References Cited

U.S. PATENT DOCUMENTS

| | | | |
|---|---|---|---|
| 9,277,589 B2* | 3/2016 | Westerberg | H04W 76/16 |
| 9,386,106 B1* | 7/2016 | Perumal | H04W 12/128 |
| 11,197,204 B2 | 12/2021 | Faus Gregori et al. | |
| 11,323,922 B2 | 5/2022 | Zetterlund et al. | |
| 2016/0044719 A1* | 2/2016 | Sidhu | H04W 68/00 370/329 |
| 2017/0318493 A1* | 11/2017 | Laselva | H04W 8/04 |
| 2018/0375991 A1* | 12/2018 | Bot | H04W 76/12 |
| 2019/0182666 A1* | 6/2019 | Kotay | H04W 76/18 |
| 2020/0252850 A1* | 8/2020 | Zhong | H04W 36/1446 |
| 2021/0249146 A1* | 8/2021 | Stern | G05B 19/042 |

* cited by examiner

*Primary Examiner* — Kharye Pope
(74) *Attorney, Agent, or Firm* — Jones Robb, PLLC

(57) ABSTRACT

Systems and methods are provided for voice call optimization. Methods include receiving a request to initiate a voice call from a wireless device configured to connect to a WLAN of a wireless gateway device. In response to receiving the request, the method includes determining an organizationally unique identifier (OUI) of the wireless gateway device and searching a database containing organizationally unique identifiers (OUIs) for the OUI of the wireless gateway device. The method further includes executing the voice call over a cellular network without using the wireless gateway device upon finding the OUI of the wireless gateway device in the database.

20 Claims, 6 Drawing Sheets

VOICE OVER WI-FI AVOIDANCE ON GATEWAY DEVICES

TECHNICAL BACKGROUND

A wireless network, such as a cellular network, can include an access node (e.g., base station) serving multiple wireless devices or user equipment (UE) in a geographical area covered by a radio frequency (RF) transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). As access nodes have evolved, networks may include a combination of multiple access node such as 4G LTE evolved NodeBs (eNodeBs) and 5G NR next generation NodeBs (gNodeBs) or alternatively may be exclusively 4G or 5G cellular systems. Wireless devices closer to a 5G antenna are more likely to receive the benefits of the 5G technology.

The evolving capabilities of cellular systems have led to expanded use of such systems for Internet access. Thus, instead of traditional wired broadband connections, it has become possible to access the Internet through cellular technologies. These cellular technologies may utilize, for example, mobile broadband devices or fixed wireless access (FWA) devices. More recently, wireless gateway devices have become popular for home use. Such wireless gateway devices provide Internet access through the use of 4G and/or 5G networks and further provide wireless local area network (WLAN) capabilities enabling home devices to join a WLAN in order to obtain Internet access.

When wireless devices such as smart phones are connected to the WLAN provided by the wireless gateway device, these wireless devices have the ability to execute voice calls using voice over Wi-Fi (VoWiFi) calling. VoWiFi allows mobile devices to make and answer calls via a Wi-Fi network instead of using the mobile network. However, voice calls have quality of service (QoS) requirements that often cannot be met through the use of the wireless gateway devices as wireless providers controlling the mobile network often do not have high quality of service (QoS) requirements for voice packets transferred over wireless gateway devices. Further, because the wireless devices are necessarily in range of cellular communications networks in order to utilize the wireless gateway device, the wireless devices are also capable of making voice calls without connecting to a WLAN. Voice calls can typically be executed using, for example voice over long term evolution (VoLTE), which may provide a higher QoS for voice calls than the VoWiFi.

Accordingly, a solution is needed for automatically improving the voice call experience for wireless devices that access the Internet using a wireless gateway device without a sufficient QoS requirement to support voice calling.

Overview

Exemplary embodiments described herein include systems, methods, wireless devices, access nodes, and non-transitory computer readable mediums for improving voice call quality through VoWiFi avoidance for particular wireless gateway devices. An exemplary method includes receiving a voice call request on a wireless device configured to connect to a Wi-Fi network for Voice over Wi-Fi calling through a wireless gateway device. In response to the request, the method includes determining an organizationally unique identifier (OUI) of the wireless gateway device and searching a database containing OUIs for the OUI of the wireless gateway device. The method additionally includes executing the voice call over a cellular network without using the wireless gateway device upon finding the OUI of the wireless gateway device in the database.

An additional exemplary embodiment includes a wireless device configured for voice over Wi-Fi calling through connection with a wireless gateway device associated with a Wi-Fi network. The wireless devices includes at least one memory storing instructions and a database containing OUIs. The wireless device further includes a processor executing the stored instructions to perform multiple operations. The operations include, in response to a request for a voice call, determining an OUI of the wireless gateway device, searching the database containing the OUIs to determine that the OUI of the wireless gateway device is stored in the database, and executing the voice call over a cellular network without using the wireless gateway device.

In yet a further exemplary embodiment, a non-transitory computer readable medium is provided for automatically selectively disabling VoWiFi. The non-transitory computer readable medium stores instructions executed by a processor to perform multiple operations. The operations include determining an organizationally unique identifier (OUI) of a wireless gateway device having a Wi-Fi network in response to a request for a voice call on a wireless device configured to connect to the Wi-Fi network. The operations include searching a database containing OUIs of wireless gateway devices to determine that the OUI of the wireless gateway device is stored in the database. The operations further include causing the voice call to be executed over a cellular network without using the wireless gateway device.

Additional exemplary embodiments include a system capable of performing the operations set forth above. The system includes a database of OUIs. The OUI database may be stored in a wireless device, an access node, or elsewhere in a wireless network. The system also includes a processor for managing voice calls through searching of the OUI database.

DETAILED DESCRIPTION

Figure 1:
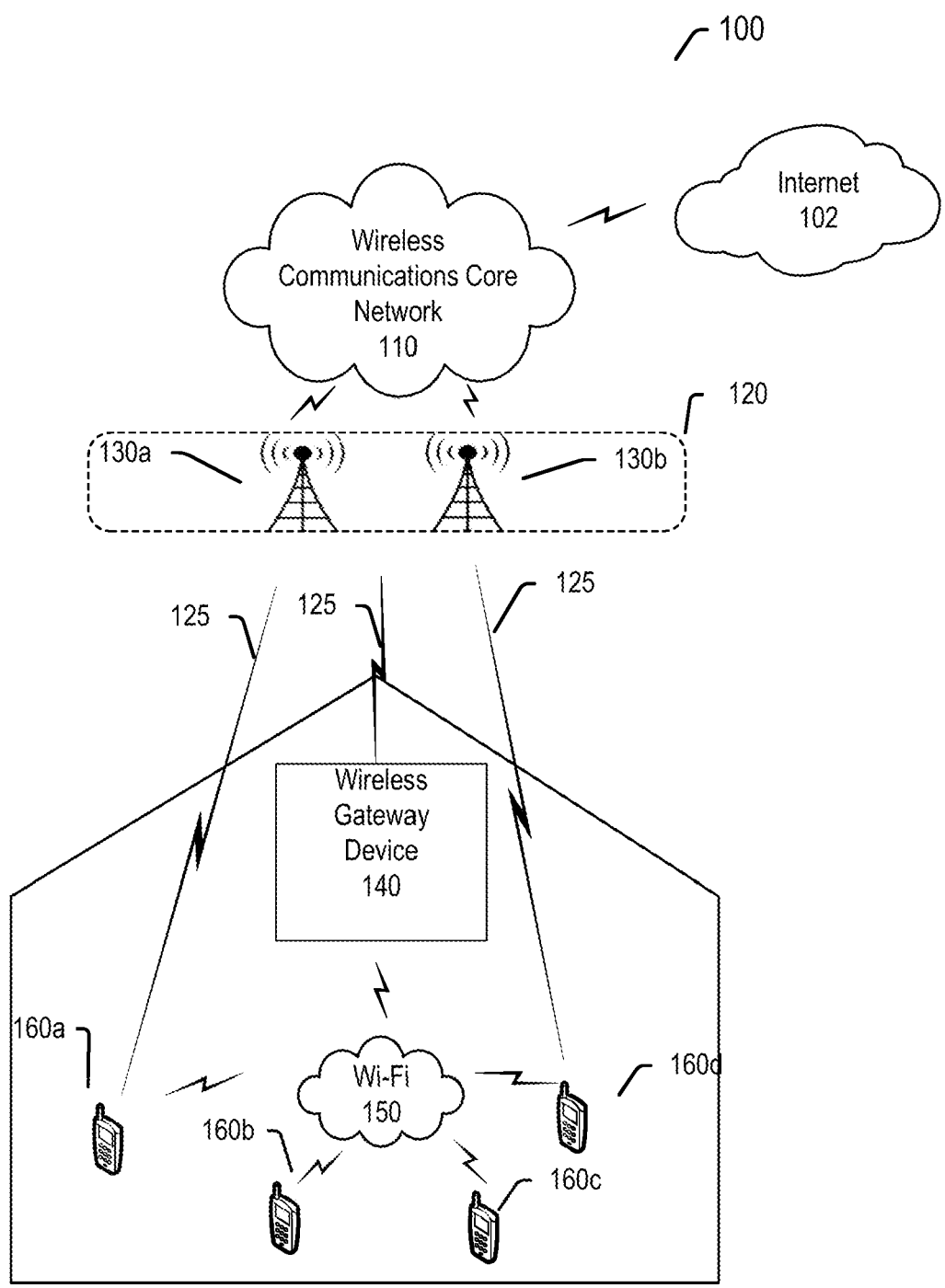
FIG. 1 depicts an exemplary system for wireless communication, in accordance with the disclosed embodiments.

Exemplary embodiments described herein include systems, methods, wireless devices, and computer readable mediums for improving voice call quality of service by dynamically managing a Wi-Fi connection. By searching a database containing identifying information for Wi-Fi gateways (wireless gateway devices) lacking voice packet QoS requirements, methods and systems described herein avoid connecting to Wi-Fi gateways lacking voice packet QoS requirements and instead apply settings to execute voice calls over a cellular network without connecting to Wi-Fi.

Wi-Fi gateways may, for example, include a router/modem combination allowing wireless devices to connect to Wi-Fi and further to connect to the Internet through the use of cellular network. The cellular network may, for example, utilize 4G LTE or 5G RATs. Other RATs may alternatively or additionally be implemented. Each W-Fi gateway may be assigned a media access control (MAC) address. The MAC address is a unique identifier for use as a network address. The address typically includes a manufacturer's organizationally unique identifier (OUI). The OUI uniquely identifies a vendor, manufacturer, or a particular piece of equipment. The first three octets of the MAC address can be identified as the OUI.

In particular, embodiments set forth herein include enhanced logic for creating and storing a database containing OUI address of Wi-Fi gateways that are not assigned voice packet QoS requirements. Accordingly, networks utilizing such devices can add the OUI of each of the devices to the database. Upon receiving a request for a voice call, wireless devices can be configured to determine an OUI of a connected Wi-Fi gateway. Subsequently, the wireless device searches the database for the OUI of the wireless gateway device. Thus, the wireless devices may include processing equipment for searching the created OUI database for the OUI of the connected Wi-Fi gateway. When the OUI of the connected Wi-Fi gateway is contained in the database, the wireless device may dynamically adjust or override its Wi-Fi settings to execute the call over the cellular network without connecting to the WLAN provided by the wireless gateway device. For example, instead of using VoWiFi, the wireless device will execute the voice call using VoLTE or other available mode having a better voice call quality or higher QoS requirement. In this manner, each voice call is assured to receive the highest QoS available.

In embodiments described herein, a local copy of the OUI database may be stored on each wireless device. Further, the database may be stored at an access node and may be periodically downloaded to wireless devices capable of making voice calls. Alternatively, each wireless device capable of making a voice call may access the OUI database stored at the access node. In further embodiments, the OUI database may be located elsewhere in a wireless network, such as for example, in another processing node within the network.

The wireless gateway devices that allow connection over a cellular network to the Internet may also referred to as home internet (HINT) devices. These HINT devices typically do not offer specific voice service QoS for any VoWiFi traffic. Although traditional broadband connections also lack this QoS, there is no guarantee that cellular service is provided in the location of the traditional broadband connection. Further, even when cellular service is provided in the location of a traditional broadband connections, signal quality may be poor. In contrast, the wireless gateway devices or HINTS only operate effectively in areas with a strong cellular signal. Thus, wireless devices using VoWifi from a wireless gateway or HINT device are more susceptible to greater latency and congestion compared to the traditional wireline broadband. Thus, in embodiments described herein, wireless devices configured for VoWifi consult a database either stored locally or remotely to identify the HINT or wireless gateway device OUIs and avoid using VoWifi for voice calls when using these systems. Accordingly, wireless devices in these scenarios use their traditional cellular voice-based service and avoid any bottlenecks and poor experience caused by using HINT connectivity for VoWifi.

In embodiments disclosed herein, a cell or wireless network may be provided by an access node. The access node may utilize one or more antennas to communicate with wireless devices or user equipment (UEs), such as for example, wireless phones and wireless gateway devices. Performance at a particular wireless device may be dependent on a number of factors including, for example, signal strength parameters and interference indicators. Further, performance of wireless devices executing various applications may be dependent on a QoS assigned by the network.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

An exemplary system described herein includes at least an access node (or base station), such as an eNodeB, or gNodeB, as well as one or more wireless gateway devices and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations for optimizing voice call QoS may be implemented as computer-readable instructions implemented by a wireless device or network nodes such as processing nodes. The processing node may include a processor included in the access node or a processor included in any controller node in the wireless network that is coupled to the access node.

FIG. 1 depicts an exemplary communication network 100. A core network 110 is coupled to a radio access network (RAN) 120 including access nodes 130a, 130b. The core network 110 and RAN 120 serve wireless gateway device 140 and wireless devices 160a, 160b, 160c, 160d over communication links. The wireless devices 160a, 160b, 160c, 160d can include end-user wireless devices (e.g., UEs) The communication links 125 use 5G NR, 4G LTE, or any other suitable type of radio access technology (RAT). Core network 110 can be structured as an evolved packet core (EPC) network or as a 5G core using a service-based architecture (SBA) utilizing core network functions and elements, including, for example, user plane functions (UPF) control plane functions (CPF). The core network 110 provides access to the Internet 102.

The RAN 120 can include various access network functions and devices disposed between the core network 110 and the wireless devices 160a, 160b, 160c, 160d. For example, the RAN 120 includes at least an access node (or base station), such as eNodeB and/or gNodeB 130a, 130b communicating with the plurality of wireless devices 160a, 160b, 160c, 160d. It is understood that the disclosed technology may also be applied to communication between an end-user wireless device and other network resources, depending on the RAT and network technology being implemented. Further, either of core network 110 and radio access network 120 can include one or more of a local area network, a wide area network, and an internetwork (including the Internet) capable of communicating signals and carrying data, for example, to support voice, push-to-talk, broadcast video, and data communications by wireless devices 160a, 160b, 160c, 160d. Alternatively or additionally to the UPF and CPF, the illustrated network topology can include packet gateways, such as a CUPS based user plane S-GW, P-GW, or SAE-GW.

The core network 110 may incorporate many functions not shown in FIG. 1. For example, the CPF may include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The UPF may also include, for example, a Unified Data Repository (UDR).

Wireless devices 160a, 160b, 160c, 160d may be any device, system, combination of devices, or other such communication platform capable of communicating wirelessly with RAN 120 using one or more frequency bands deployed therefrom. Each of wireless devices 160a, 160b, 160c, 160d may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via RAN 120. Wireless devices 160a, 160b, 160c, 160d may also include, for example Internet of Things (IoT) devices. Although four wireless devices are illustrated in FIG. 1, any number of wireless devices may be included.

The wireless gateway device 140 may be or include a router or router/modem combination that deploys a wireless local area network (WLAN) 150 providing Internet access via Wi-Fi to wireless devices 160a, 160b, 160c, 160d. The wireless gateway device 140 is assigned a MAC address that includes an OUI that identifies the wireless gateway device 140. Further, it should be noted that methods described herein may be performed for any device providing WLAN 150 and the device creating the WLAN is not necessarily a wireless gateway device. Instead, the device providing the WLAN may be a more traditional wired broadband modem.

Other network elements may be present to facilitate communication but are omitted for clarity, such as base stations, base station controllers, mobile switching centers, dispatch application processors, and location registers such as a home location register or visitor location register. Components not specifically shown in FIG. 1 can further include processing nodes, controller nodes, routers, gateways, and physical and/or wireless data links for communicating signals among various network elements, additional base stations, controller nodes, telephony switches, internet routers, network gateways, computer systems, communication links, or other type of communication equipment, and combinations thereof.

Figure 2:
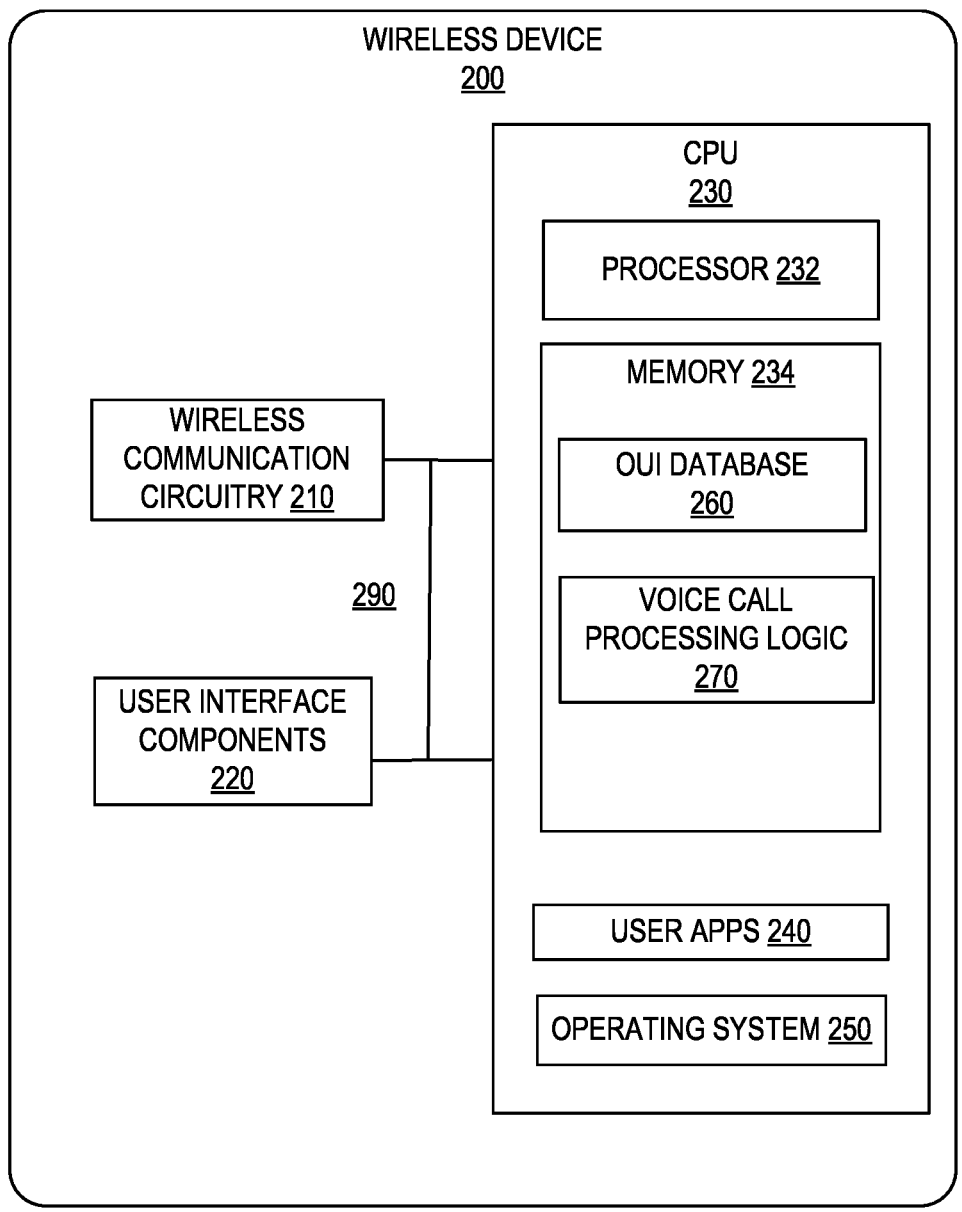
FIG. 2 depicts an exemplary wireless device in accordance with disclosed embodiments.

FIG. 2 depicts a wireless device (such as a UE) 200 in accordance with disclosed embodiments. The wireless device 200 may correspond to, or be a representation of the wireless devices 160a, 160b, 160c, 160d as shown in FIG. 1. As illustrated, the wireless device 200 includes wireless communication circuitry 210, user interface components 220, a central processing unit (CPU) 230, processor 232, memory 234, user apps 240, and operating system 250. Components may be connected, for example, by a bus 290. These components are merely exemplary and the wireless device 200 may include a larger or smaller number of components capable of performing the functions described herein. Wireless devices such as smartphones may have multiple microprocessors and microcontrollers. A microprocessor may have a bus to communicate with memory on separate chips and buses to communicate with the rest of the equipment. Alternatively or additionally, the mobile phone may include a System On a Chip (SoC).

The memory 234 may store, for example, an OUI database 260 and voice call processing logic 270. When executed by the processor 232, the voice call processing logic 270 interacts with the OUI database 260 to perform the method described below with reference to FIGS. 5 and 6. In the illustrated embodiment, the OUI database 260 is located within the wireless device 200. However, in additional embodiments, the OUI database 260 may be disposed within an access node, a separate processing node, or elsewhere in the network.

The OUI database 260 may be utilized to store OUIs of devices capable of providing a WLAN for wireless devices and further having structure connecting the devices to a cellular network. In particular, the OUIs stored in the OUI database 260 identify wireless gateway devices that do not provide a sufficient QoS requirement for voice packets. This occurs, for example, when settings of the connected cellular network do not assign a QoS requirement for the wireless gateway device.

Thus, in embodiments provided herein, the voice call processing logic 270 and the OUI database 260 operate in conjunction with the processor 232 to perform a method for ensuring sufficient voice call quality for wireless devices such as the wireless device 200. In order to ensure optimized QoS for voice calls, the voice call processing logic 270 determines, based on information in the OUI database, whether a voice call should be executed through VoWiFi or be diverted to the cellular network directly.

The wireless communication circuitry 210 may include circuit elements configured to generate wireless signals (e.g., one or more antennas) as well as interface elements configured, for example, to translate control signals from the CPU 230 into data signals for wireless output. Further, the wireless communication circuitry 210 may include multiple elements, for example to communicate in different modes with different RATs. The CPU 230 may be configured to receive, interpret, and/or respond to signals received via the wireless communication circuitry 210. The CPU 230 may be configured to receive a network command (e.g., from an access node such as the RAN 120) to perform other specified functions. The user interface components 220 may be or include any components enabling a user to interact with the wireless device 200, including tools for managing the voice call processing logic 270 and Wi-Fi settings of the wireless device 200.

Accordingly, in the embodiment described with respect to FIG. 2, more robust voice calling capabilities are provided for the wireless device 200 so that the wireless device 200 receives the highest possible voice call quality.

Figure 3:
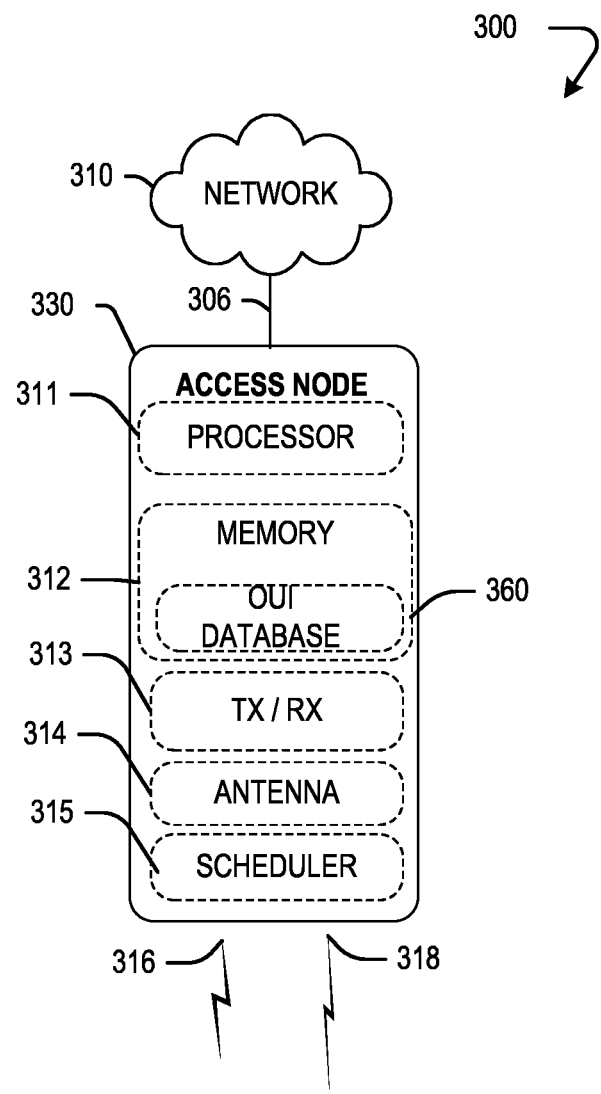
FIG. 3 depicts an exemplary access node in accordance with disclosed embodiments.

FIG. 3 illustrates an operating environment 300 for an exemplary access node 330 in accordance with the disclosed embodiments. In exemplary embodiments, access node 330 can include, for example, a gNodeB or an eNodeB. Access node 330 may comprise, for example, a macro-cell access node, such as access nodes 130 described with reference to FIG. 1. Access node 330 is illustrated as comprising a processor 311, memory 312, transceiver(s) 313, and antenna(s) 314, and scheduler 315. Processor 311 executes instructions stored on memory 312, while transceiver(s) 313 and antenna(s) 314 enable wireless communication with other network nodes, such as wireless devices and wireless gateway devices described herein, and other nodes. For example, wireless devices may initiate uplink transmissions such that the transceivers 313 and antennas 314 receive messages from the wireless devices, for example, over communication links 316 and 318 and pass the messages to a mobility entity in the core network. Further, the transceivers 313 and antennas 314 receive signals from the mobility entity such as a mobility management entity (MME) or access and mobility function (AMF) and pass the messages to the appropriate wireless device. Scheduler 315 may be provided for scheduling resources based on the presence and performance parameters of the wireless devices. The access node 330 may connect over a communication link 306 to a network 310. Network 310 may be similar to core network 110 discussed above.

In embodiments provided herein, the memory 312 may further store an OUI database 360. Thus, a processor from the wireless device, such as processor 232 may communicate with the access node 330 in order to determine whether the OUI of the wireless gateway device 140 is stored in the OUI database 360. For example, the processor 232 may download the contents of the OUI database 360. Alternatively, the processor 232 may generate a query for the OUI database 360 and the wireless device 200 may send the query to the access node 330. Yet in other embodiments, the access node 330 may not include the OUI database 360. In this instance, the wireless device 200 will have an OUI database 260 or another component in the network will store the OUI database.

Figure 4:
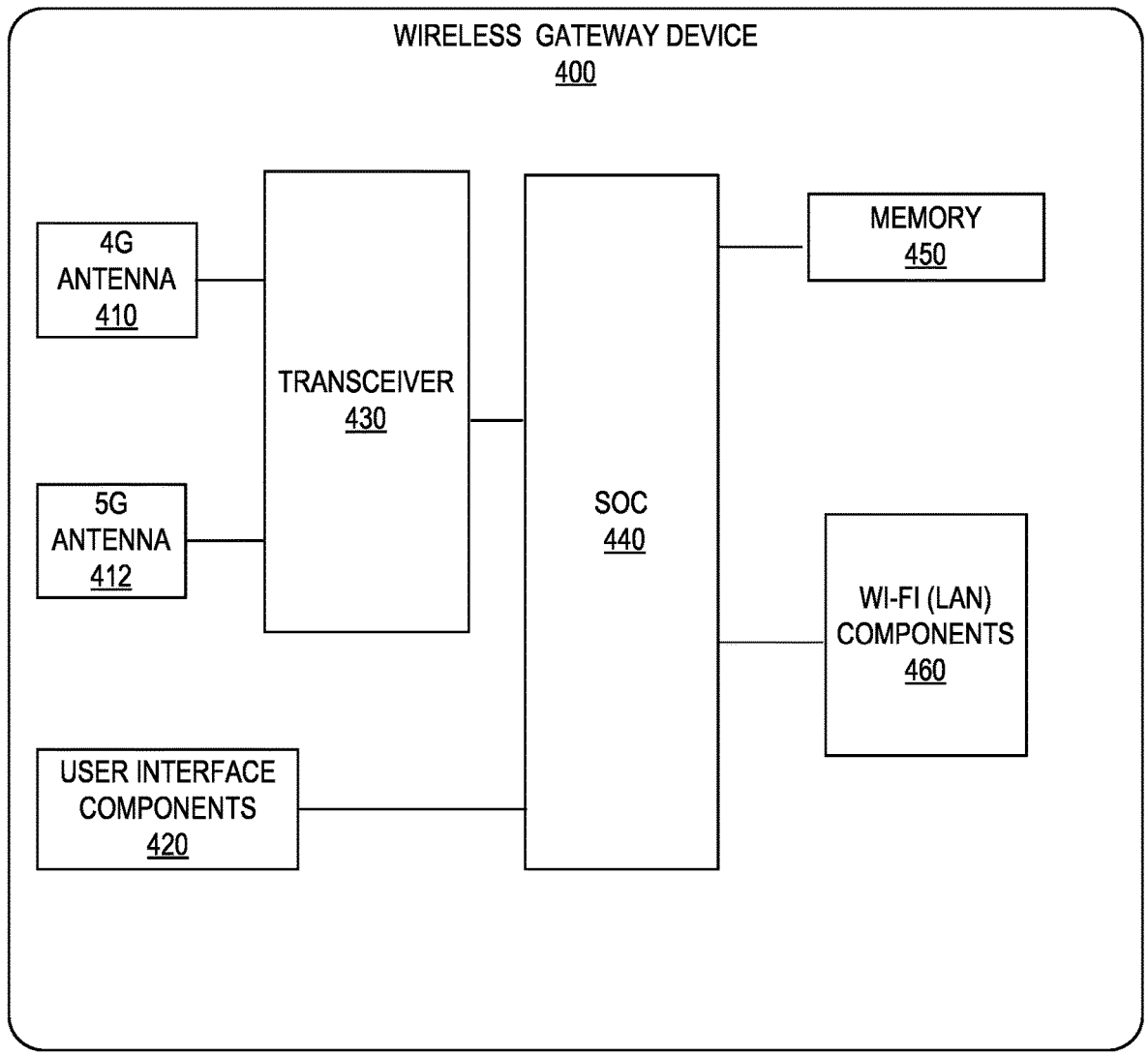
FIG. 4 depicts an exemplary wireless gateway device in accordance with disclosed embodiments.

FIG. 4 illustrates a wireless gateway device 400 in accordance with embodiments described herein. The components described herein are merely exemplary as many different configurations for the wireless gateway device 400 may be implemented. The wireless gateway device 400 may include, for example, multiple antennas for communicating with a cellular network such as antenna 410 and antenna 412. Different antennas may connect with different RATs. For example, antenna 410 may connect with a 4G RAT and antenna 412 may communicate with a 5G RAT. The wireless gateway device 400 may further include a transceiver 430, a system on chip (SoC) 440, a memory 450, and Wi-Fi or LAN components 460. Other components may also be included.

The user interface components 420 may operate to allow set-up of the wireless gateway device 400 directly from the wireless gateway device 400. Alternatively, wireless gateway device 400 may be configured to interact with a wireless device, for example using a mobile app, for setup purposes.

The SoC 440 is an integrated circuit that integrates most or all components of a computer or other electronic system. The SoC 440 includes a central processing unit (CPU), memory interfaces, on-chip input/output devices, input/output interfaces, and secondary storage interfaces. Other components, such as a radio modem and radio frequency signal processing may also be included.

The SoC 440 integrates a microcontroller, microprocessor or perhaps several processor cores with peripherals like a GPU, Wi-Fi and cellular network radio modems, and/or one or more coprocessors.

The components of the SoC 440 cause the wireless gateway device 400 to function as a both a router and a modem in order to ensure wireless devices access to the Internet through a WLAN. The Wi-Fi or LAN components 460 may include additional antennas, transceivers, and other components to provide the WLAN. In additional embodiments ethernet technologies are incorporated in the wireless gateway device 400 to add to its functionality.

Further, it should be noted that each wireless gateway device 400 is provided with a MAC address. Each MAC address includes an OUI for the wireless gateway device 400. In operation, each wireless device communicates with the wireless gateway device 400 to determine the OUI of the wireless gateway device 400.

Figure 5:
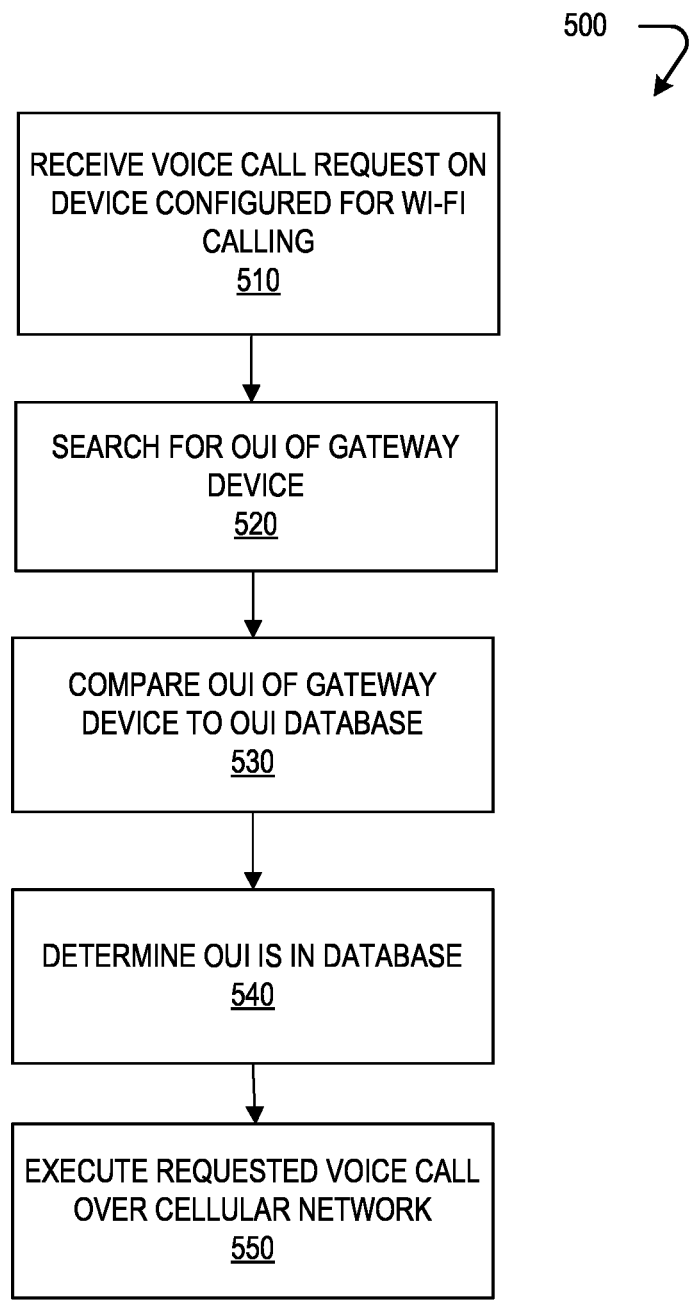
FIG. 5 is a flow chart illustrating a method for enhancing voice call quality in accordance with one disclosed embodiment.

The disclosed methods for optimizing voice call quality are further described with reference to FIGS. 5 and 6. FIG. 5 illustrates an exemplary method 500 performed by a wireless device or a wireless device in combination with an access node for optimizing voice call quality. Method 500 may be performed by any suitable processor discussed herein, for example, the processor 232 included in the wireless device 200 or the processor 232 in combination with an access node processor 311 or a processor included in a controller node. For the sake of convenience, the method is described as being performed by the wireless device 200.

Method 500 starts in step 510, when the wireless device 200, which is configured for connection to wireless gateway device 400 receives a request for a voice call. For example, the wireless device 200 may receive a request for a voice call through the keypad or other user interface components 220 of the wireless device 200. In response to the request, instead of immediately connecting the call using the WLAN provided by the wireless gateway device 400, the processor 232 of the wireless device 200 searches for the OUI of the wireless gateway device 400 in step 520.

In embodiments set forth herein, the wireless device 200 ascertains and stores the OUI of the wireless gateway device 400 upon initial configuration. For example, when the wireless device 200 is configured to connect to the WLAN provided by the wireless gateway device 400 through a settings menu of the wireless device, the wireless device ascertains and stores the OUI of the wireless gateway device 400. In this scenario, upon receiving the voice call request in step 510, the wireless device 200 searches its own memory for the OUI of the wireless gateway device 400 in step 520.

Subsequently, in step 530, processor 232 of the wireless device 200 searches the OUI database 260 stored on the wireless device 200 for the OUI of the wireless gateway device 400. In alternative embodiments, the wireless device 200 searches an external OUI database, such as that shown in FIG. 3 at the access node, or an external database located elsewhere in the network.

In step 540, the wireless device determines that the OUI of the wireless gateway device 400 is in the OUI database. As a result, in step 550, the requested call is executed over the cellular network directly instead of through the VoWiFi provided by the wireless gateway device 400. In some embodiments, upon finding the OUI of the wireless gateway device 400 in the OUI database, the wireless device 200 utilize processor 232 to automatically override the Wi-Fi settings in the wireless device 200 to avoid connecting to the WLAN provided by the wireless gateway device 400. In alternative embodiments, the processor 232 changes the wireless device settings, specifically, the wi-fi settings in the wireless device 200 in order to de-activate Wi-Fi and cause the call to be executed directly over the cellular network. Further, the processor 232 causes the wireless device 200 to disconnect from the provided Wi-Fi network. Thus, whenever the OUI of the wireless gateway device 400 is found in the OUI database, the voice call is executed directly over the cellular network in step 550.

Figure 6:
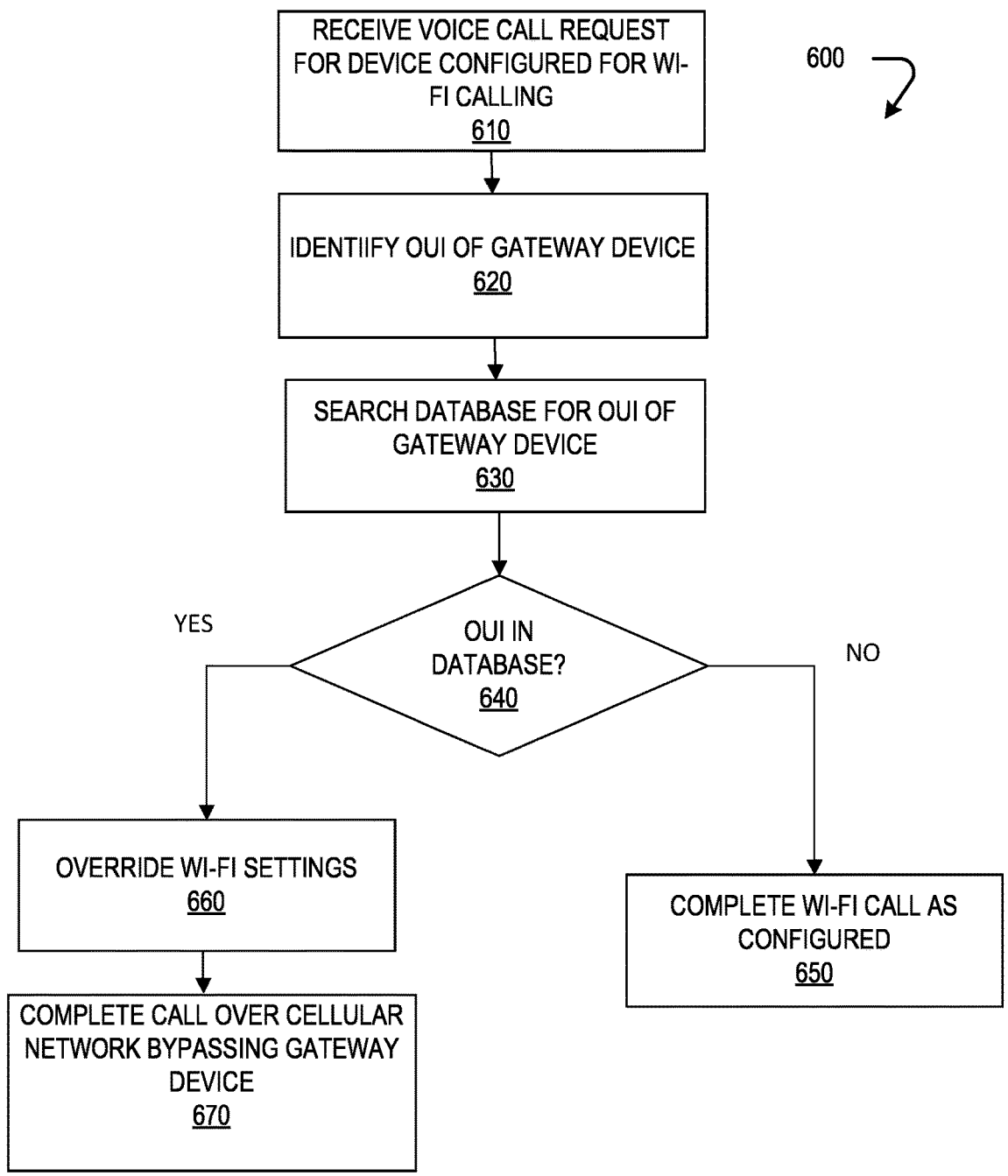
FIG. 6 is a flow chart illustrating a more detailed method for enhancing voice call quality in accordance with a further disclosed embodiment.

FIG. 6 illustrates a further method 600 for optimizing voice call quality for a wireless device 200. Method 600 may be performed by a processor, for example, the processor 232 in the wireless device 200. Alternatively, the steps may be performed by a processor of an access node, such as the processor 311 of the access node 330. For the sake of illustration, the method is described as being performed by the wireless device 200.

Method 600 starts in step 610, when the wireless device 200, which is configured for connection to wireless gateway device 400 receives a request for a voice call. For example, the wireless device 200 may receive a request for a voice call through the keypad or other user interface components 220 of the wireless device 200. In response to the request, instead of immediately connecting the call using the WLAN provided by the wireless gateway device 400, the processor 232 of the wireless device 200 searches for the OUI of the wireless gateway device 400 in step 620.

In embodiments set forth herein, the wireless device 200 ascertains and stores the OUI of the wireless gateway device 400 upon initial configuration. For example, when the wireless device 200 is configured to connect to the WLAN provided by the wireless gateway device 400 through a settings menu of the wireless device, the wireless device ascertains and stores the OUI of the wireless gateway device 400. In this scenario, upon receiving the voice call request in step 610, the wireless device 200 searches its own memory for the OUI of the wireless gateway device 400 in step 620.

Subsequently, in step 630, processor 232 of the wireless device 200 searches the OUI database 260 stored on the wireless device 200 for the OUI of the wireless gateway device 400. In alternative embodiments, the wireless device 200 searches an external OUI database, such as that shown in FIG. 3 at the access node, or an external database located elsewhere in the network.

If the OUI of the gateway device is not in the OUI database in step 640, the wireless device 200 completes the call while connected to the Wi-Fi network provided by the wireless gateway device 400 or other connected router/modem combination in step 650. When the OUI is not in the database, the connected router/modem configuration may not in fact be a wireless gateway device, but instead a more traditional broadband device. If the provided Wi-Fi is not supplied by a wireless gateway device 400, but instead by a more traditional wired device, the voice call quality for VoWiFi may be superior to voice call quality provided for voice calls directly over the cellular network. For example, the cellular signal in the vicinity of the traditional router/modem may have an insufficient signal strength to provide a voice call connection.

Alternatively, if the OUI of the wireless gateway device 400 is in the OUI database in step 640, the wireless device determines that the OUI of the wireless gateway device 400 is in the OUI database. As a result, in step 660, the processor 232 of the wireless device 200 overrides the Wi-Fi settings of the wireless device. Accordingly, in step 670, the requested call is executed over the cellular network directly instead of through the VoWi-Fi provided by the wireless gateway device 400. In other embodiments, upon finding the OUI of the wireless gateway device 400 in the OUI database, the wireless device 200 utilizes processor 232 to change the wi-fi settings in the wireless device 200 in order to de-activate Wi-Fi and cause the call to be executed directly over the cellular network. Thus, whenever the OUI of the wireless gateway device 400 is found in the OUI database, the voice call is executed directly over the cellular network in step 550.

In some embodiments, methods 500 and 600 may include additional steps or operations. Furthermore, the methods may include steps shown in each of the other methods. As one of ordinary skill in the art would understand, the methods 500 and 600 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
receiving, through a user interface on a wireless device configured to connect to a Wi-Fi network for Voice over Wi-Fi calling through a wireless gateway device, a request to initiate a voice call;
in response to the request, determining an organizationally unique identifier (OUI) of the wireless gateway device;
searching a database containing organizationally unique identifiers (OUIs) for the OUI of the wireless gateway device, wherein the OUIs stored in the database correspond to wireless gateway devices that do not have quality of service (QoS) requirements for voice packets set by a cellular network; and executing the voice call over the cellular network without using the wireless gateway device upon finding the OUI of the wireless gateway device in the database.

2. The method of claim 1, further comprising disconnecting the wireless device from the Wi-Fi network upon identifying the wireless gateway device.

3. The method of claim 1, further comprising searching a database stored on the wireless device.

4. The method of claim 1, further comprising searching a database stored in a radio access network (RAN).

5. The method of claim 1, further comprising determining the OUI of the wireless gateway device by searching wireless device settings of the wireless device.

6. The method of claim 1, further comprising disconnecting the wireless device from the Wi-Fi network by dynamically adjusting wireless device settings.

7. The method of claim 1, further comprising disconnecting the wireless device from the Wi-Fi network by overriding wireless device settings.

8. The method of claim 1, wherein the wireless gateway device is a home internet device.

9. A wireless device configured for voice over Wi-Fi calling through connection with a wireless gateway device associated with a Wi-Fi network, the wireless device comprising:
at least one memory storing instructions and a database containing organizationally unique identifiers (OUIs); and
a processor executing the stored instructions to perform operations comprising:
in response to a request for a voice call, determining an OUI of the wireless gateway device;
searching the database containing the OUIs to determine that the OUI of the wireless gateway device is stored in the database, wherein the OUIs stored in the database correspond to wireless gateway devices that do not have quality of service (QoS) requirements for voice packets set by a cellular network; and
executing the voice call over the cellular network without using the wireless gateway device.

10. The wireless device of claim 9, wherein the processor further executes instructions to disconnect the wireless device from the Wi-Fi network upon identifying the wireless gateway device.

11. The wireless device of claim 9, the operations further comprising determining the OUI of the wireless gateway device by searching wireless device settings.

12. The wireless device of claim 9, the operations further comprising disconnecting the wireless device from the Wi-Fi network by dynamically adjusting wireless device settings.

13. The wireless device of claim 9, the operations further comprising disconnecting the wireless device from the Wi-Fi network by overriding wireless device settings.

14. The wireless device of claim 9, wherein the wireless device is connected to a home internet device wireless local area network (WLAN).

15. A non-transitory computer readable medium, storing instructions executed by a processor to perform operations comprising:
determining an organizationally unique identifier (OUI) of a wireless gateway device providing a Wi-Fi network in response to a request for a voice call on a wireless device configured to connect to the Wi-Fi network;
searching a database containing OUIs of home internet devices to determine that the OUI of the wireless gateway device is stored in the database, wherein the OUIs stored in the database correspond to wireless gateway devices that do not have quality of service (QoS) requirements for voice packets set by a cellular network; and
causing the voice call to be executed over the cellular network without using the wireless gateway device.

16. The non-transitory computer-readable medium of claim 15, the operations further comprising disconnecting the wireless device from the Wi-Fi network upon identifying the wireless gateway device as a home internet device.

17. The non-transitory computer-readable medium of claim 15, the operations further comprising searching a database stored on the wireless device.

18. The non-transitory computer-readable medium of claim 15, the operations further comprising searching a database stored in a radio access network (RAN).

19. The non-transitory computer readable medium of claim 15, the operations further comprising determining the OUI of the wireless gateway device by searching wireless device settings.

20. The non-transitory computer-readable medium of claim 15, the operations further comprising disconnecting the wireless device from the Wi-Fi network by overriding wireless device settings.

\* \* \* \* \*